United States Patent
Kottomtharayil et al.

(10) Patent No.: US 10,262,003 B2
(45) Date of Patent: *Apr. 16, 2019

(54) SMART ARCHIVING AND DATA PREVIEWING FOR MOBILE DEVICES

(71) Applicant: CommVault Systems, Inc., Tinton Falls, NJ (US)

(72) Inventors: Rajiv Kottomtharayil, Marlboro, NJ (US); Anand Vibhor, Manalapan, NJ (US); Prakash Varadharajan, Manalapan, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/674,169

(22) Filed: Mar. 31, 2015

(65) Prior Publication Data

US 2015/0205817 A1    Jul. 23, 2015

Related U.S. Application Data

(63) Continuation of application No. 13/792,736, filed on Mar. 11, 2013, now Pat. No. 9,020,890.

(Continued)

(51) Int. Cl.
*G06F 17/30* (2006.01)
*G06F 1/3234* (2019.01)
*G06F 1/3212* (2019.01)

(52) U.S. Cl.
CPC ...... *G06F 17/30179* (2013.01); *G06F 1/3212* (2013.01); *G06F 1/3234* (2013.01);
(Continued)

(58) Field of Classification Search
None
See application file for complete search history.

(56) References Cited

U.S. PATENT DOCUMENTS 4,686,620 A   8/1987   Ng
4,713,755 A   12/1987  Worley, Jr. et al.
(Continued)

FOREIGN PATENT DOCUMENTS

EP   0259912 A1   3/1988
EP   0405926 A2   1/1991
(Continued)

OTHER PUBLICATIONS

Armstead et al., "Implementation of a Campwide Distributed Mass Storage Service: The Dream vs. Reality," IEEE, Sep. 11-14, 1995, pp. 190-199.
(Continued)

*Primary Examiner* — Anhtai V Tran
(74) *Attorney, Agent, or Firm* — Perkins Coie LLP

(57) ABSTRACT

Techniques for providing data preview before recalling large data files are disclosed. In one aspect, a data file is made accessible while being offline by converting the data file from a native format to a preview format, storing the data file in the preview format in a primary storage that is locally available and moving, after the conversion to the preview format, the data file in the native format to a secondary storage. When a viewing request is received for the data file, the data file in the preview format is displayed to fulfill the viewing request.

16 Claims, 11 Drawing Sheets

Related U.S. Application Data

(60) Provisional application No. 61/618,125, filed on Mar. 30, 2012.

(52) U.S. Cl.
CPC .. *G06F 17/30174* (2013.01); *G06F 17/30215* (2013.01); *G06F 17/30221* (2013.01); *Y02D 10/174* (2018.01)

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,822,780 A | 10/1998 | Schutzman |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem |
| 6,094,416 A | 7/2000 | Ying |
| 6,125,369 A | 9/2000 | Wu et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,477,544 B1 | 11/2002 | Bolosky et al. |
| 6,487,561 B1 | 11/2002 | Ofek et al. |
| 6,513,051 B1 | 1/2003 | Bolosky et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo et al. |
| 6,609,183 B2 | 8/2003 | Ohran |
| 6,609,187 B1 | 8/2003 | Merrell et al. |
| 6,658,526 B2 | 12/2003 | Nguyen et al. |
| 6,675,177 B1 | 1/2004 | Webb |
| 6,704,730 B2 | 3/2004 | Moulton et al. |
| 6,745,304 B2 | 6/2004 | Playe |
| 6,757,699 B2 | 6/2004 | Lowry |
| 6,757,794 B2 | 6/2004 | Cabrera et al. |
| 6,795,903 B2 | 9/2004 | Schultz et al. |
| 6,810,398 B2 | 10/2004 | Moulton |
| 6,862,674 B2 | 3/2005 | Dice et al. |
| 6,865,655 B1 | 3/2005 | Andersen |
| 6,868,417 B2 | 3/2005 | Kazar et al. |
| 6,889,297 B2 | 5/2005 | Krapp et al. |
| 6,901,493 B1 | 5/2005 | Maffezzoni |
| 6,912,645 B2 | 6/2005 | Dorward et al. |
| 6,928,459 B1 | 8/2005 | Sawdon et al. |
| 6,952,758 B2 | 10/2005 | Chron et al. |
| 6,959,368 B1 | 10/2005 | St. Pierre et al. |
| 6,973,553 B1 | 12/2005 | Archibald, Jr. et al. |
| 6,976,039 B2 | 12/2005 | Chefalas et al. |
| 7,017,113 B2 | 3/2006 | Bourbakis et al. |
| 7,035,876 B2 | 4/2006 | Kawai et al. |
| 7,035,880 B1 | 4/2006 | Crescenti et al. |
| 7,035,943 B2 | 4/2006 | Yamane et al. |
| 7,085,904 B2 | 8/2006 | Mizuno et al. |
| 7,089,383 B2 | 8/2006 | Ji et al. |
| 7,089,395 B2 | 8/2006 | Jacobson et al. |
| 7,092,956 B2 | 8/2006 | Ruediger |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson et al. |
| 7,139,808 B2 | 11/2006 | Anderson et al. |
| 7,143,091 B2 | 11/2006 | Charnock et al. |
| 7,191,290 B1 | 3/2007 | Ackaouy et al. |
| 7,200,604 B2 | 4/2007 | Forman et al. |
| 7,200,621 B2 | 4/2007 | Beck et al. |
| 7,246,272 B2 | 7/2007 | Cabezas et al. |
| 7,272,606 B2 | 9/2007 | Borthakur et al. |
| 7,287,252 B2 | 10/2007 | Bussiere et al. |
| 7,290,102 B2 | 10/2007 | Lubbers et al. |
| 7,310,655 B2 | 12/2007 | Dussud |
| 7,320,059 B1 | 1/2008 | Armangau et al. |
| 7,325,110 B2 | 1/2008 | Kubo et al. |
| 7,330,997 B1 | 2/2008 | Odom |
| 7,343,459 B2 | 3/2008 | Prahlad et al. |
| 7,370,003 B2 | 5/2008 | Pych |
| 7,376,805 B2 | 5/2008 | Stroberger et al. |

(56) References Cited

U.S. PATENT DOCUMENTS

| | | |
|---|---|---|
| 7,383,304 B2 | 6/2008 | Shimada et al. |
| 7,383,462 B2 | 6/2008 | Osaki et al. |
| 7,389,345 B1 | 6/2008 | Adams |
| 7,395,282 B1 | 7/2008 | Crescenti et al. |
| 7,409,522 B1 | 8/2008 | Fair et al. |
| 7,444,382 B2 | 10/2008 | Malik |
| 7,444,387 B2 | 10/2008 | Douceur et al. |
| 7,478,113 B1 | 1/2009 | De Spiegeleer et al. |
| 7,480,782 B2 | 1/2009 | Garthwaite |
| 7,487,245 B2 | 2/2009 | Douceur et al. |
| 7,490,207 B2 | 2/2009 | Amarendran et al. |
| 7,493,314 B2 | 2/2009 | Huang et al. |
| 7,493,456 B2 | 2/2009 | Brittain et al. |
| 7,496,604 B2 | 2/2009 | Sutton, Jr. et al. |
| 7,512,745 B2 | 3/2009 | Gschwind et al. |
| 7,519,726 B2 | 4/2009 | Palliyil et al. |
| 7,533,331 B2 | 5/2009 | Brown et al. |
| 7,536,440 B2 | 5/2009 | Budd et al. |
| 7,568,080 B2 | 7/2009 | Prahlad et al. |
| 7,577,687 B2 | 8/2009 | Bank et al. |
| 7,603,529 B1 | 10/2009 | MacHardy et al. |
| 7,613,748 B2 | 11/2009 | Brockway et al. |
| 7,617,297 B2 | 11/2009 | Bruce et al. |
| 7,631,120 B2 | 12/2009 | Darcy |
| 7,631,194 B2 | 12/2009 | Wahlert et al. |
| 7,636,824 B1 | 12/2009 | Tormasov |
| 7,647,462 B2 | 1/2010 | Wolfgang et al. |
| 7,657,550 B2 | 2/2010 | Prahlad et al. |
| 7,661,028 B2 | 2/2010 | Erofeev |
| 7,668,884 B2 | 2/2010 | Prahlad et al. |
| 7,672,779 B2 | 3/2010 | Fuchs |
| 7,672,981 B1 | 3/2010 | Faibish et al. |
| 7,676,590 B2 | 3/2010 | Silverman et al. |
| 7,685,126 B2 | 3/2010 | Patel et al. |
| 7,685,177 B1 | 3/2010 | Hagerstrom et al. |
| 7,685,384 B2 | 3/2010 | Shavit |
| 7,685,459 B1 | 3/2010 | De Spiegeleer et al. |
| 7,698,699 B2 | 4/2010 | Rogers et al. |
| 7,721,292 B2 | 5/2010 | Frasier et al. |
| 7,734,581 B2 | 6/2010 | Gu et al. |
| 7,747,579 B2 | 6/2010 | Prahlad et al. |
| 7,747,659 B2 | 6/2010 | Bacon et al. |
| 7,778,979 B2 | 8/2010 | Hatonen et al. |
| 7,786,881 B2 | 8/2010 | Burchard et al. |
| 7,788,230 B2 | 8/2010 | Dile et al. |
| 7,814,142 B2 | 10/2010 | Mamou et al. |
| 7,818,287 B2 | 10/2010 | Torii et al. |
| 7,818,495 B2 | 10/2010 | Tanaka et al. |
| 7,818,531 B2 | 10/2010 | Barrall |
| 7,831,707 B2 | 11/2010 | Bardsley |
| 7,831,795 B2 | 11/2010 | Prahlad et al. |
| 7,836,161 B2 | 11/2010 | Scheid |
| 7,840,537 B2 | 11/2010 | Gokhale et al. |
| 7,853,750 B2 | 12/2010 | Stager |
| 7,856,414 B2 | 12/2010 | Zee |
| 7,865,678 B2 | 1/2011 | Arakawa et al. |
| 7,870,105 B2 | 1/2011 | Arakawa et al. |
| 7,870,486 B2 | 1/2011 | Wang et al. |
| 7,873,599 B2 | 1/2011 | Ishii et al. |
| 7,873,806 B2 | 1/2011 | Prahlad et al. |
| 7,882,077 B2 | 2/2011 | Gokhale et al. |
| 7,899,990 B2 | 3/2011 | Moll et al. |
| 7,921,077 B2 | 4/2011 | Ting et al. |
| 7,953,706 B2 | 5/2011 | Prahlad et al. |
| 7,962,452 B2 | 6/2011 | Anglin |
| 8,028,106 B2 | 9/2011 | Bondurant et al. |
| 8,037,028 B2 | 10/2011 | Prahlad et al. |
| 8,041,907 B1 | 10/2011 | Wu et al. |
| 8,051,367 B2 | 11/2011 | Arai et al. |
| 8,054,765 B2 | 11/2011 | Passey et al. |
| 8,055,618 B2 | 11/2011 | Anglin |
| 8,055,627 B2 | 11/2011 | Prahlad et al. |
| 8,055,745 B2 | 11/2011 | Atluri |
| 8,078,603 B1 * | 12/2011 | Chandratillake ............ G06F 17/30846 707/706 |
| 8,086,799 B2 | 12/2011 | Mondal et al. |
| 8,108,429 B2 | 1/2012 | Sim-Tang et al. |
| 8,112,357 B2 | 2/2012 | Mueller et al. |
| 8,131,687 B2 | 3/2012 | Bates et al. |
| 8,140,786 B2 | 3/2012 | Bunte et al. |
| 8,156,092 B2 | 4/2012 | Hewett et al. |
| 8,156,279 B2 | 4/2012 | Tanaka et al. |
| 8,161,003 B2 | 4/2012 | Kavuri |
| 8,165,221 B2 | 4/2012 | Zheng et al. |
| 8,166,263 B2 | 4/2012 | Prahlad et al. |
| 8,170,994 B2 | 5/2012 | Tsaur et al. |
| 8,190,823 B2 | 5/2012 | Waltermann et al. |
| 8,190,835 B1 | 5/2012 | Yueh |
| 8,219,524 B2 | 7/2012 | Gokhale |
| 8,234,444 B2 | 7/2012 | Bates et al. |
| 8,271,992 B2 | 9/2012 | Chatley et al. |
| 8,285,683 B2 | 10/2012 | Prahlad et al. |
| 8,295,875 B2 | 10/2012 | Masuda |
| 8,296,260 B2 | 10/2012 | Ting et al. |
| 8,315,984 B2 | 11/2012 | Frandzel |
| 8,346,730 B2 | 1/2013 | Srinivasan et al. |
| 8,375,008 B1 | 2/2013 | Gomes |
| 8,380,957 B2 | 2/2013 | Prahlad et al. |
| 8,392,677 B2 | 3/2013 | Bunte et al. |
| 8,401,996 B2 | 3/2013 | Muller et al. |
| 8,412,677 B2 | 4/2013 | Klose |
| 8,412,682 B2 | 4/2013 | Zheng et al. |
| 8,548,953 B2 | 10/2013 | Wong et al. |
| 8,578,120 B2 | 11/2013 | Attarde et al. |
| 8,620,845 B2 | 12/2013 | Stoakes et al. |
| 8,626,723 B2 | 1/2014 | Ben-Shaul et al. |
| 8,712,969 B2 | 4/2014 | Prahlad et al. |
| 8,712,974 B2 | 4/2014 | Datuashvili et al. |
| 8,725,687 B2 | 5/2014 | Klose |
| 8,769,185 B2 | 7/2014 | Chung |
| 8,782,368 B2 | 7/2014 | Lillibridge et al. |
| 8,880,797 B2 | 11/2014 | Yueh |
| 8,909,881 B2 | 12/2014 | Bunte et al. |
| 8,935,492 B2 | 1/2015 | Gokhale et al. |
| 8,965,852 B2 | 2/2015 | Jayaraman |
| 9,015,181 B2 | 4/2015 | Kottomtharayil et al. |
| 9,058,117 B2 | 6/2015 | Attarde et al. |
| 2005/0254072 A1 * | 11/2005 | Hirai ............... G06T 3/4092 358/1.2 |
| 2008/0126543 A1 * | 5/2008 | Hamada ........... G06F 17/30038 709/225 |
| 2008/0162597 A1 * | 7/2008 | Tysowski .......... G06F 17/30581 |
| 2009/0179754 A1 * | 7/2009 | Burchard ............ G06F 1/28 340/540 |
| 2011/0125711 A1 * | 5/2011 | Meisenheimer .... G06F 17/3028 707/621 |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |
| WO | WO-03027891 A1 | 4/2003 |
| WO | WO-2006052872 A2 | 5/2006 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

Canada Office Action for Application No. 2706007, dated Jul. 30, 2014, 2 pages.
Commvault Systems, Inc., "Continuous Data Replicator 7.0," Product Data Sheet, 2007, 6 pages.
CommVault Systems, Inc., "Deduplication—How to,"; <http://documentation.commvault.com/commvault/release_8_0_0/books_online_1/english_US;/features/single_instance/single_instance_how_to.htm>, earliest known publication date:; Jan. 26, 2009, 7 pages.
CommVault Systems, Inc., "Deduplication,"; <http://documentation.commvault.com/commvault/release_8_0_0/books_online_1/english_US;/features/single_instance/single_instance.htm>, earliest known publication date: Jan. 26, 2009, 9; pages.
Diligent Technologies "HyperFactor," <http://www.diligent.com/products:protecTIER-1:HyperFactor-1>, Internet accessed on Dec. 5, 2008, 2 pages.
Eitel, "Backup and Storage Management in Distributed Heterogeneous Environments," *IEEE*, Jun. 12-16, 1994, pp. 124-126.
Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.
Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.
Extended European Search Report for EP07865192.4; dated May 2, 2013, 7 pages.
Federal Information Processing Standards Publication 180-2, "Secure Hash Standard", Aug. 1, 2002, ; <http://csrc.nist.gov/publications/fips/fips1 80-2/fips 1 80-2withchangenotice. pdf>, 83 pages.
Gait, J., "The Optical File Cabinet: A Random-Access File System for Write-Once Optical Disks," *IEEE Computer*, vol. 21, No. 6, pp. 11-22 (Jun. 1988).
Geer, D., "Reducing the Storage Burden Via Data Deduplication," IEEE, Computer Journal, vol. 41, Issue 12, Dec. 2008, pp. 15-17.
Handy, Jim, "The Cache Memory Book: The Authoritative Reference on Cache Design," Second Edition, 1998, pp. 64-67 and pp. 204-205.
International Preliminary Report on Patentability and Written Opinion for PCT/US2007/086421, dated Jun. 18, 2009, 8 pages.
International Preliminary Report on Patentability and Written Opinion for PCT/US2011/054378, dated Apr. 11, 2013, 5 pages.
International Search Report and Written Opinion for PCT/US07/86421, dated Apr. 18, 2008, 9 pages.
International Search Report for Application No. PCT/US09/58137, dated Dec. 23, 2009, 14 pages.
International Search Report for Application No. PCT/US10/34676, dated Nov. 29, 2010, 9 pages.
International Search Report for Application No. PCT/US11/54378, dated May 2, 2012, 8 pages.
Jander, M., "Launching Storage-Area Net," *Data Communications*, US, McGraw Hill, NY, vol. 27, No. 4 (Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Kulkarni P. et al., "Redundancy elinination within large collections of files," Proceedings of the Usenix Annual Technical Conference, Jul. 2, 2004, pp. 59-72.
Lortu Software Development, "Kondar Technology-Deduplication," <http://www.lortu.com/en/deduplication.asp>, Internet accessed on Dec. 5, 2008, 3 pages.
Menezes et al., "Handbook of Applied Cryptography", CRC Press, 1996, <http://www.cacr.math.uwaterloo.ca/hac/aboutlchap9.pdf>, 64 pages.
Microsoft, "Computer Dictionary", p. 249, Fifth Edition, 2002, 3 pages.
Microsoft, "Computer Dictionary", pp. 142, 150, 192, and 538, Fifth Edition, 2002, 6 pages.
Overland Storage, "Data Deduplication," <http://www.overlandstorage.com/topics/data_deduplication.html>, Internet accessed on Dec. 5, 2008, 2 pages.
Partial Supplementary European Search Report in Application No. 09816825.5, dated Apr. 15, 2015, 6 pages.
Quantum Corporation, "Data De-Duplication Background: A Technical White Paper," May 2008, 13 pages.
Rosenblum et al., "The Design and Implementation of a Log-Structured File System," *Operating Systems Review SIGOPS*, vol. 25, No. 5, New York, US, pp. 1-15 (May 1991).
SearchStorage, "File System", Nov. 1998, <http://searchstorage.techtarget.com/definition/file-system>, 10 pages.
Sharif, A., "Cache Memory," Sep. 2005, http://searchstorage.techtarget.com/definition/cache-memory, pp. 1-26.
Webopedia, "Cache," Apr. 11, 2001, http://web.archive.org/web/20010411033304/http://www.webopedia.com/TERM/c/cache.html pp. 1-4.
Webopedia, "Data Duplication", Aug. 31, 2006, <http://web.archive.org/web/20060913030559/http://www.webopedia.com/TERMID/data_deduplication.html>, 2 pages.

\* cited by examiner

SMART ARCHIVING AND DATA PREVIEWING FOR MOBILE DEVICES

CROSS-REFERENCE TO RELATED APPLICATION(S)

The present application is a continuation of U.S. patent application Ser. No. 13/792,736, filed Mar. 11, 2013 (U.S. Pat. No. 9,020,890), entitled SMART ARCHIVING AND DATA PREVIEWING FOR MOBILE DEVICES, which claims priority to and the benefit of U.S. Provisional Application No. 61/618,125, filed Mar. 30, 2012, entitled SMART ARCHIVING AND DATA PREVIEWING FOR MOBILE DEVICES, each of which are hereby incorporated herein by reference in their entireties.

BACKGROUND

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example, to prevent loss of data in the event a problem occurred with the data stored in primary storage.

To protect primary copy data or for other purposes, such as regulatory compliance, secondary copies (alternatively referred to as "data protection copies") can be made. Examples of secondary copies include a backup copy, a snapshot copy, a hierarchical storage management ("HSM") copy, an archive copy, and other types of copies.

A backup copy is generally a point-in-time copy of the primary copy data stored in a backup format as opposed to in native application format. For example, a backup copy may be stored in a backup format that is optimized for compression and for efficient long-term storage. Backup copies generally have relatively long retention periods and may be stored on media with slower retrieval times than other types of secondary copies and media. In some cases, backup copies may be stored at an offsite location.

After an initial, full backup of a data set is performed, periodic, intermittent, or continuous incremental backup operations may be subsequently performed on the data set. Each incremental backup operation copies only the primary copy data that has changed since the last full or incremental backup of the data set was performed. In this way, even if the entire set of primary copy data that is backed up is large, the amount of data that must be transferred during each incremental backup operation may be significantly smaller, since only the changed data needs to be transferred to secondary storage. Combined, one or more full backup and subsequent incremental copies may be utilized together to periodically or intermittently create a synthetic full backup copy. More details regarding synthetic storage operations are found in commonly-assigned U.S. patent application Ser. No. 12/510,059, entitled "Snapshot Storage and Management System with Indexing and User Interface," filed Jul. 27, 2009, now U.S. Pat. No. 7,873,806, which is hereby incorporated by reference herein in its entirety.

An archive copy is generally a copy of the primary copy data, but typically includes only a subset of the primary copy data that meets certain criteria and is usually stored in a format other than the native application format. For example, an archive copy might include only that data from the primary copy that is larger than a given size threshold or older than a given age threshold and that is stored in a backup format. Often, archive data is removed from the primary copy, and a stub is stored in the primary copy to indicate its new location. When a user requests access to the archive data that has been removed or migrated, systems use the stub to locate the data and often make recovery of the data appear transparent, even though the archive data may be stored at a location different from the remaining primary copy data.

Archive copies are typically created and tracked independently of other secondary copies, such as other backup copies. For example, to create a backup copy, the data storage system transfers a secondary copy of primary copy data to secondary storage and tracks the backup copy using a backup index separate from the archive index. To create an archive copy, a conventional data storage system transfers the primary copy data to be archived to secondary storage to create an archive copy, replaces the primary copy data with a stub, and tracks the archive copy using an archive index. Accordingly, the data storage system will transfer two separate times to secondary storage a primary copy data object that is both archived and backed-up.

Since each transfer consumes network and computing resources, when the transfers are taking place, the data storage system may not be able to devote such resources to other tasks. Moreover, the data storage system is required to devote resources to maintaining each separate index. In some cases, the archive index may be unaware of the other secondary copy and the other secondary index may be unaware of the archive copy, which may lead to further inefficiencies. Moreover, in some cases, in the event that an archive copy is moved or transferred (e.g., to another tier of secondary storage), the archive index may not be able to be updated to reflect the move or transfer. In such cases, the data storage system may be unable to use the stub to locate the archived data object.

In some operational scenarios, a user may want to browse through files to either take a quick look at the content or identify a particular file that the user is interested in, before the user decides to recall the entire file from a secondary backup or an archive, or open the file for reading or writing using the native application for the file.

Recently, Apple Computers has introduced a facility called "Quick Look" in their computer products. Quick Look allows users to look at the contents of a file in a finder application window at full or near-full size resolution, depending on the size of the document relative to the desktop. Quick Look allows viewing of files in different formats such as PDFs and Microsoft Word, Excel, and PowerPoint file formats. While Quick Look allows quick navigation through various files, no storage efficiencies are gained by using the Quick Look format.

Another problem relates to data storage on mobile devices. Often, data storage on mobile devices is not optimized. Since mobile devices often have limited storage capacity, such lack of optimization affects performance of the device, affects the user experience, etc.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following detailed description.

DETAILED DESCRIPTION

The techniques disclosed in this document are useful, in one aspect, in solving the above-discussed problems related to browsing through large data files before recalling the data files from a secondary storage. In another aspect, the disclosed techniques can be used to convert large data files from their native format (e.g., an MPEG (Moving Pictures Expert Group) video file, or a PowerPoint file, etc.,) to a preview format. The converted preview format copy, for example, may require significantly lower storage space and require less bandwidth to transfer between devices. In some implementations, the converted preview format copy may disable the ability to select and copy text or images from the file, but may still allow a low-resource way for a user to browse through the content of the file. When some of the files that the user browses may be relatively large and may be archived in a secondary storage, a user's browsing through such files may use network resources such as Input/Output bandwidth and processing power. The use of file copies in a preview format, also called stub files, in one aspect, reduce the amount of computational resources needed for a user's file browsing operation.

The headings provided herein are for convenience only and do not necessarily affect the scope or meaning of the disclosure.

Overview

A software, firmware, and/or hardware system for facilitating data previewing before recalling large data files are disclosed. Also disclosed a software, firmware, and/or hardware system to keep devices "clean" by archiving or moving to secondary storage unused data and applications.

Various examples of the techniques will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management Environment

Figure 1:
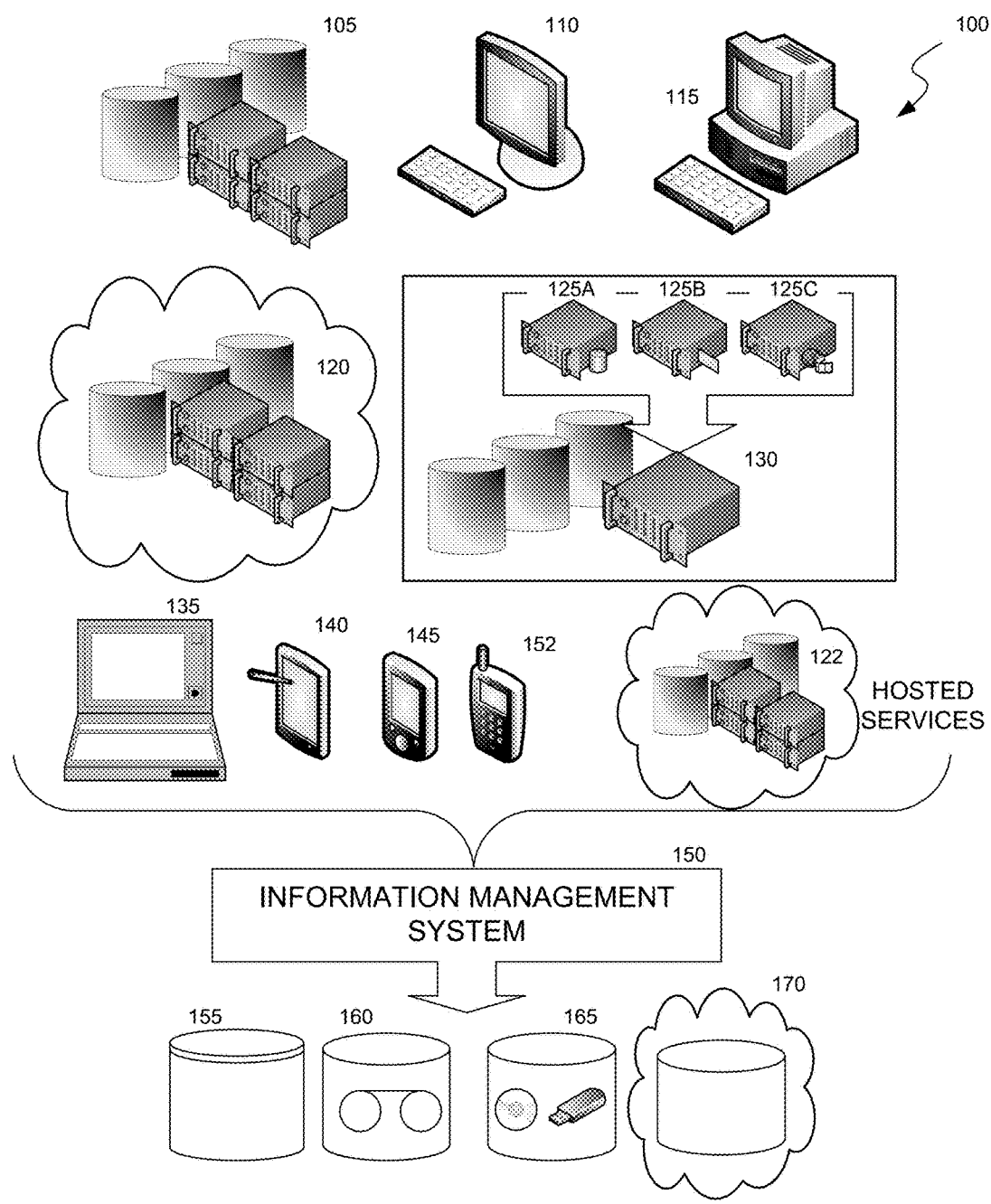
FIG. 1 is a block diagram illustrating an example of suitable information management environment in which aspects of the inventive system may operate.

Aspects of the technologies described herein may be practiced in an information management environment 100, which will now be described while referencing FIG. 1. As shown in FIG. 1, the environment 100 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 105 (such as mail servers, file servers, database servers, print servers, and web servers), personal computers 110, workstations 115, or other types of fixed computing systems such as mainframe computers and minicomputers (not shown). The servers 105 may include network-attached storage (NAS) filers.

The environment 100 may include virtualized computing resources, such as a virtual machine 120 provided to the organization by a third-party cloud service vendor or a virtual machine 125 running on a virtual machine host 130 operated by the organization. For example, the organization may use one virtual machine 125A as a database server and another virtual machine 125B as a mail server. The environment 100 may also include mobile or portable computing devices, such as laptops 135, tablet computers 140, personal data assistants 145, mobile phones 152 (such as smartphones), and other mobile or portable computing devices such as embedded computers, set top boxes, vehicle-mounted devices, wearable computers, etc.

Of course, other types of computing devices may form part of the environment 100. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 100 may also include hosted services 122 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 150 to protect and manage the data and metadata used by the various computing devices in the environment 100 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 150 may create the additional non-production copies of the data and metadata on any suitable non-production storage medium such as magnetic disks 155, magnetic tapes 160, other storage media 165 such as solid-state storage devices or optical disks, or on cloud data storage sites 170 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication Number 2010/0332456, which is hereby incorporated herein by reference in its entirety.

Figure 2:
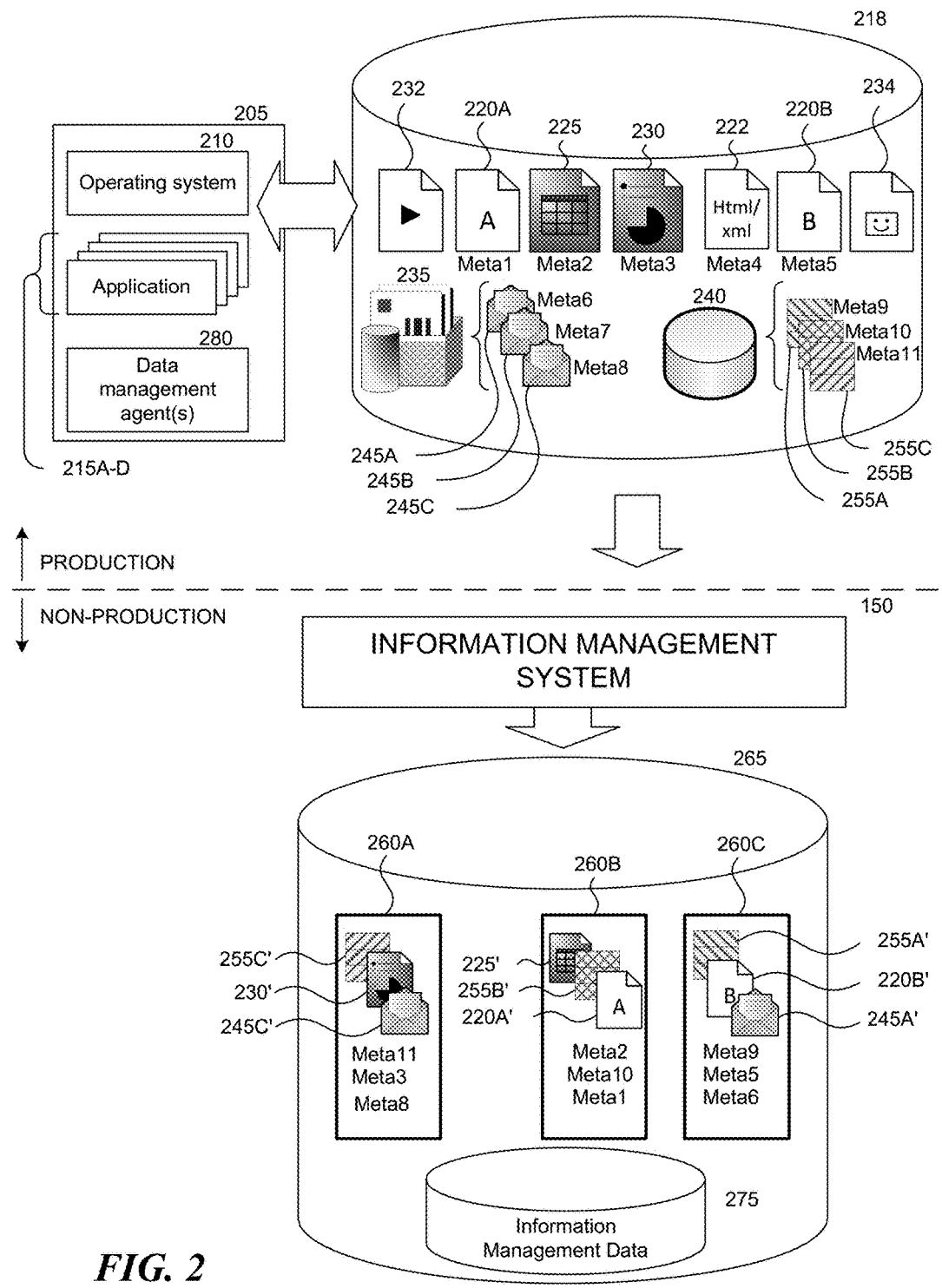
FIG. 2 illustrates examples of production and non-production data that may be processed by the information management environment of FIG. 1.

FIG. 2 helps illustrates some differences between "production copies" of data and metadata and "non-production copies" of data and metadata in the data management environment 100. As shown, each computing device 205 in the environment 100 has at least one operating system 210 installed and one or more applications 215A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 218, which may be a network attached storage filer or form part of a Hadoop distributed file system, Open VMS file system, or other type of distributed file system, simply by making conventional file system calls via the operating system 210, without needing the information management system 150 to intervene on behalf of the operating system or application. The production copies of files may include structured data (e.g., database files), unstructured data (e.g., documents), and/or semi-structured data, and thus may include one or more documents 220A-B, spreadsheets 225, presentation documents 230, video files 232, image files 234, email mailboxes 235, html/xml or other types of markup language files 222, and/or databases 240. The operating system 210 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 215 or the operating system 210 treats as an independent functional unit, but which is not separately addressed in the associated file system. For example, a single email mailbox 235 may include multiple email messages 245A-C, email headers, and attachments. As another example, a single database 240 may include multiple tables 255A-C. As used herein, a "data object" refers to both (1) any file that is currently or previously addressable by a file system and (2) a functional subset of such a file that has a particular function for a related application 215A-D or the operating system 210. Each data object may be further decomposed into one or more data blocks each of which is a collection of data bits within the data object that may not have any particular function for a related application or the operating system. In addition to data objects, the operating system 210 and applications 215A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 2, each data object may be associated with a production copy of object metadata ("Meta1-11"), which may be file system metadata and/or application-specific metadata.

The information management system 150 accesses or receives copies of the various production copies of data objects and metadata, and via an information management operation (such as a backup operation, archive operation, or snapshot operation), creates non-production copies of these data objects and metadata, often stored in one or more non-production storage mediums 265 different than the production storage medium 218 where the production copies of the data objects and metadata reside. A non-production copy of a data object represents the production data object and its associated metadata at a particular point in time (non-production objects 260A-C). Since a production copy of a data object or metadata changes over time as it is modified by an application 215, hosted service 122, or the operating system 210, the information management system 150 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 210 and applications 215A-D may be running on top of virtualization software, and the production data storage medium 218 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 260A-C may contain copies of or otherwise represent more than one production data object. For example, non-production object 260A represents three separate production data objects 255C, 230 and 245C (represented as 245C', 230' and 245', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 2 shows that a single production data object (e.g., 255C), and its associated data object metadata (e.g., Meta11) are represented by the contents of only a single non-production object (e.g., 260A), the entire contents of a single production data object and/or its metadata at a particular point in time may instead span across numerous non-production objects. Also a single non-production object 260 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 218. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 218.

Non-production copies of a data object or metadata may be distinguished from a production copy of a data object or metadata in several ways. First, a non-production copy of a data object is created to meet the different information management goals described above and is not directly used or modified by applications 215A-D, hosted services 122, or the operating system 210. Second, a non-production copy of a data object is stored as one or more non-production objects 260 that may have a format different from the native application format of the production copy of the data object, and thus often cannot be directly used by the native application or a hosted service 122 without first being modified. Third, non-production objects are often stored on a non-production storage medium 265 that is inaccessible to the applications 215A-D running on computing devices and hosted services 122. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 150 can access only with at least some human intervention (e.g. tapes located at an offsite storage site).

The information management system 150 also generates information management data 275, such as indexing information, which permit the information management system to perform its various information management tasks. As shown in FIG. 2, a computing device 205 may include one or more data management agents 280 that provide client-side functions for the information management system.

Information Management System

Figure 3:
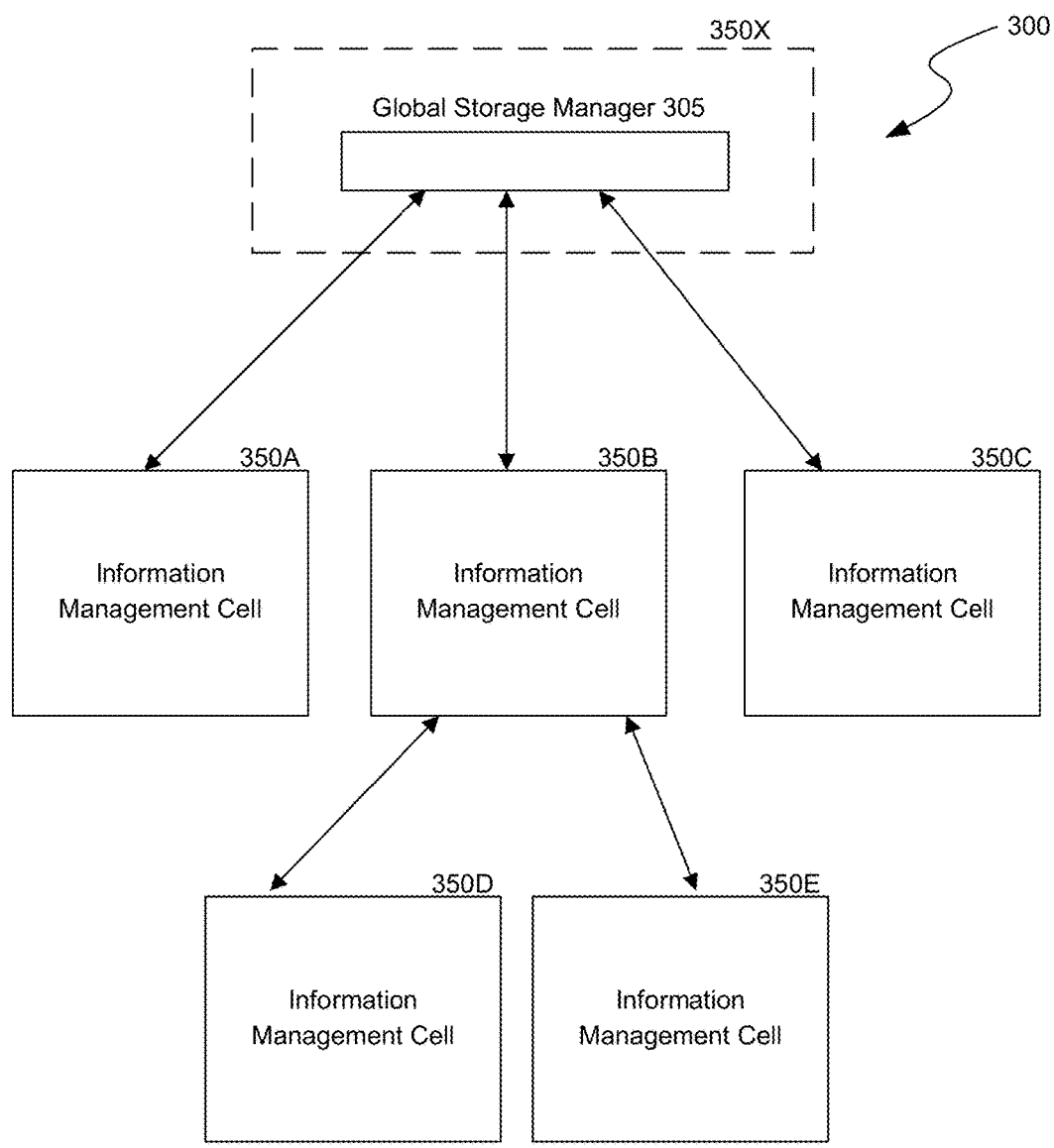
FIG. 3 is a block diagram illustrating one example of a hierarchical arrangement of resources for the information management system of FIG. 1, including information management cells.

FIG. 3 shows a hierarchical arrangement of resources that may form an information management system 150. As shown, the information management system 150 includes multiple information management cells 350 arranged in a hierarchy, with some information management cells (e.g., 350D-E) subordinate to other information management cells (e.g., 350B). A global storage manager 305, which may form part of a global information cell 350x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 350B), may perform similar tasks for its subordinate cells (e.g., 350D-E) and/or otherwise act as an intermediary between the subordinate cells and the global storage manager 305.

Information Management Cell

Figure 4:
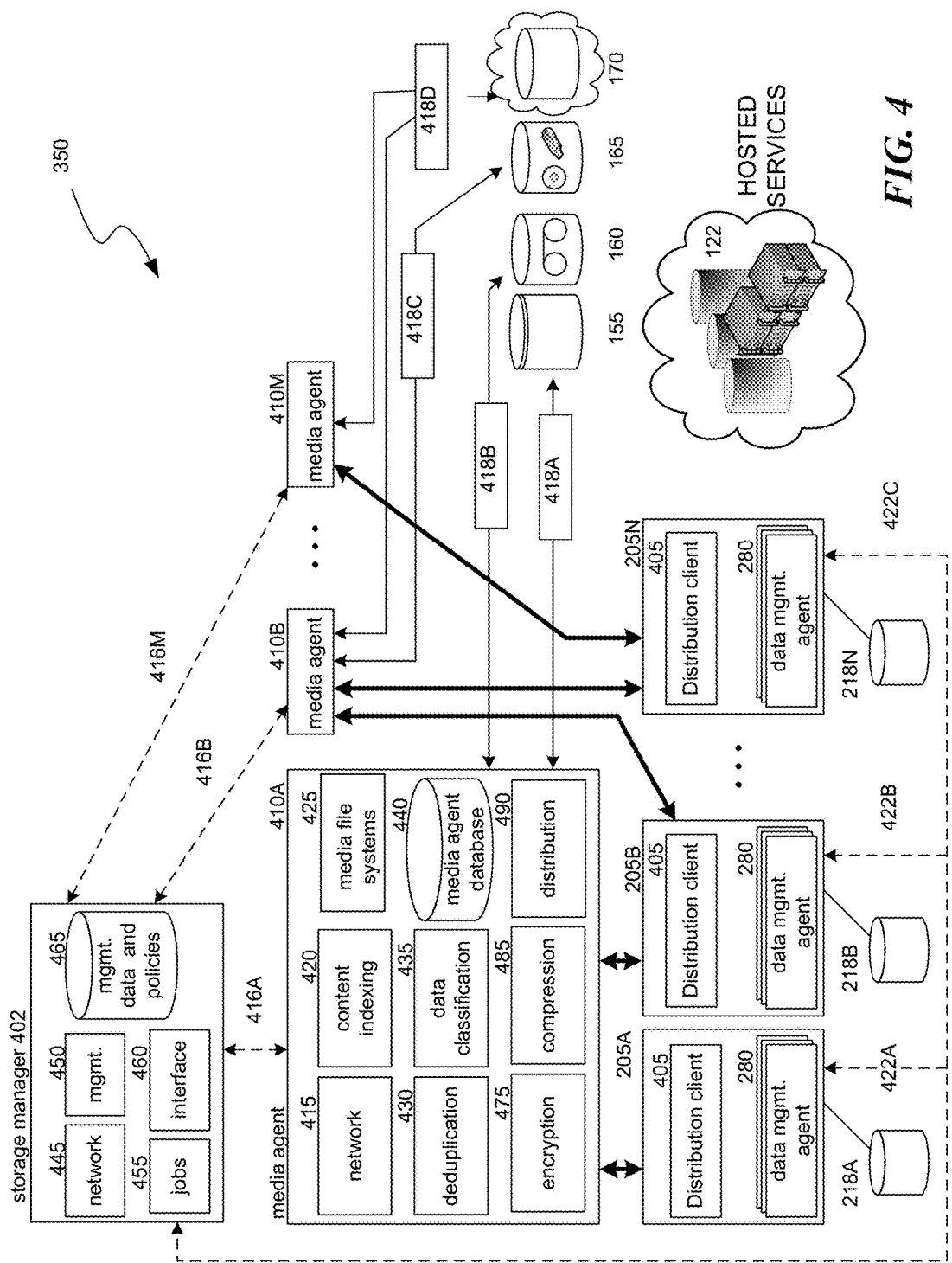
FIG. 4 is a block diagram illustrating an example of resources forming an information management cell.

FIG. 4 shows an arrangement of resources that may form an information management cell 350. As shown, the information management cell includes a storage manager 402, one or more media agents 410A-M, one or more non-production storage mediums 155-870, one or more computing devices 205A-N, and one or more production data storage mediums 218A-N. Outside of the information management cell are hosted services 122, which may interact with media agents 410 and its components, as described further herein. In some examples, all or a portion of an information management cell may be implemented as an object store, as described in assignee's U.S. patent application Ser. No. 12/751,850 (introduced above).

The storage manager 402 may be a software module or other application that coordinates and controls information management operations performed by one or more information management cells 350 to protect and control copies of non-production data objects and metadata. As shown by the dashed lines 416 and 422, the storage manager may communicate with some or all elements of the information management cell 350, such as the media agents 410 and computing devices 205, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 402 may include a jobs agent 455, a management agent 450, a network agent 445, and an interface agent 460, all of which may be implemented as interconnected software modules or application programs. The jobs agent 455 monitors the status of information management operations previously performed, currently being performed, or scheduled to be performed by the information management cell 350. The management agent 450 provides an interface that allows various management agents 450 in multiple information management cells 350 (or in a global storage manager 305) to communicate with one another. This allows each information management cell 350 to exchange status information, routing information, capacity and utilization information, and information management operation instructions or policies with other cells. In general, the network agent 445 provides the storage manager 402 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 460 includes information processing and display software, such as a graphical user interface ("GUI"), an API, or other interactive interface through which users and system processes can retrieve information about the status of information management operations or issue instructions to the information management cell and its constituent components. The storage manager 402 may also track information that permits it to select, designate, or otherwise identify content indices, deduplication databases, or similar databases within its information management cell (or another cell) to be searched in response to certain queries.

The storage manager 402 may also maintain information management data, such as a database 465 of management data and policies. The database 465 may include a management index that stores logical associations between components of the system, user preferences, user profiles (that among other things, map particular information management users to computing devices or hosted services), management tasks, or other useful data. The database 465 may also include various "information management policies," which are generally data structures or other information sources that each include a set of criteria and rules associated with performing an information management operation. The criteria may be used to determine which rules apply to a particular data object, system component, or information management operation, an may include:

frequency with which a production or non-production copy of a data object or metadata has been or is predicted to be used, accessed, or modified;

access control lists or other security information;

the sensitivity (e.g., confidentiality) of a data object as determined by its content and/or metadata;

time-related factors;

deduplication information;

the computing device, hosted service, computing process, or user that created, modified, or accessed a production copy of a data object; and an estimated or historic usage or cost associated with different components.

The rules may specify, among other things:

a schedule for performing information management operations, a location (or a class or quality of storage media) for storing a non-production copy, preferences regarding the encryption, compression, or deduplication of a non-production copy, resource allocation between different computing devices or other system components (e.g., bandwidth, storage capacity), whether and how to synchronize or otherwise distribute files or other data objects across multiple computing devices or hosted services, network pathways and components to utilize (e.g., to transfer data) during an information management operation, and retention policies (e.g., the length of time a non-production copy should be retained in a particular class of storage media).

As noted above, each computing device 205 may include one or more data management agents 280. Each data management agent is a software module or component that helps govern communications with other system components. For example, the data management agent receives commands from the storage manager 402 and sends to and receives from media agents 410 copies of data objects, metadata, and other payload (as indicated by the heavy arrows). Each data management agent accesses data and/or metadata stored in a production data storage medium 218 and arranges or packs the data and metadata in a certain format (e.g., backup or archive format) before it is transferred to another component. Each data management agent can also restore a production copy of a data object or metadata in a production data storage medium 218 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 205 may also include a data distribution and live browsing client module 405 (herein "distribution client module"). The distribution client module 405 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 410, which may be implemented as a software module, conveys data, as directed by the storage manager 402, between a computing device 205 (or hosted service 122) and one or more non-production storage mediums 155-870. Each media agent 410 may control one or more intermediary storage devices 418, such as a cloud server or a tape or magnetic disk library management system, to read, write, or otherwise manipulate data stored in a non-production storage medium 155-870. Each media agent 410 may be considered to be "associated with" a storage device and its related non-production storage media if that media agent is capable of routing data to and storing data in the storage media managed by the particular storage device. A media agent may communicate with computing devices 205, hosted services 122, storage devices 418A-D, and the storage manager 402 via any suitable communications path, including SCSI, a Storage Area Network ("SAN"), a Fiber Channel communications link, or a wired, wireless, or partially wired/wireless computer or telecommunications network, including the Internet.

To perform its functions, the media agent 410 may include a media file system module 425, a data classification module 435, a content indexing module 420, a deduplication module 430, an encryption module 475, a compression module 485, a network module 415, a distribution module 490, and a media agent database 440. The media file system module 425 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 415 permits the media agent to communicate with other components within the system and hosted services 122 via one or more proprietary and/or non-proprietary network protocols or APIs (including cloud service provider APIs, virtual machine management APIs, and hosted service provider APIs). The deduplication module 430 performs deduplication of data objects and/or data blocks to reduce data redundancy in the cell. The deduplication module may generate and store data structures to manage deduplicated data objects, such as deduplication tables, in the media agent database 440. The encryption module 475 performs encryption of data objects, data blocks, or non-production objects to ensure data security in the cell. The compression module 485 performs compression of data objects, data blocks, or non-production objects to reduce the data capacity needed in the cell.

The content indexing module 420 analyzes the contents of production copies or non-production copies of data objects and/or their associated metadata and catalogues the results of this analysis, along with the storage locations of (or references to) the production or non-production copies, in a content index stored within a media agent database 440. The results may also be stored elsewhere in the system, e.g., in the storage manager 402, along with a non-production copy of the data objects, and/or an index cache. Such index data provides the media agent 410 or another device with an efficient mechanism for locating production copies and/or non-production copies of data objects that match particular criteria. The index data or other analyses of data objects or metadata may also be used by the data classification module 435 to associate data objects with classification identifiers (such as classification tags) in the media agent database 440 (or other indices) to facilitate information management policies and searches of stored data objects.

The distribution module 490 may be a set of instructions that coordinates the distribution of data objects and indices of data objects. The distribution may occur from one computing device 205 to another computing device 205 and/or from hosted services 122 to computing devices 205. As a first example, the distribution module may collect and manage data and metadata from hosted services 122 or mobile devices 205. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

Brief Architectural Overview

A brief overview of certain aspects of the techniques described in greater detail below is now provided. In some implementations, a user is able to browse through a file system on his computer using a menu structure and user interface (UI) generally supported by his computer (e.g., Windows 7 interface, Apple iOS interface, and so on). Some of the displayed files may be stored in a secondary storage or an archive, which may not be on the user's computer, but are accessible elsewhere on a network to which the user's computer is connected. In some implementations, a visual cue is provided to a user for the user to be able to distinguish between files that are locally present and files that have been archived. In some implementations, archived files are replaced by a locally available "stub file" copy. In some implementations, the stub file copy is created by converting a file from its native format to a preview format. The preview format may be customized to minimize storage requirement at the expense of added functionality such as being able to manipulate text and graphics in the file. In one aspect, a user is able to quickly view the content of a large file using the locally stored stub file and then make a decision about whether to recall the entire file from the secondary storage; which may take a significant amount of network and computing resources.

Suitable User Interaction

Figure 5:
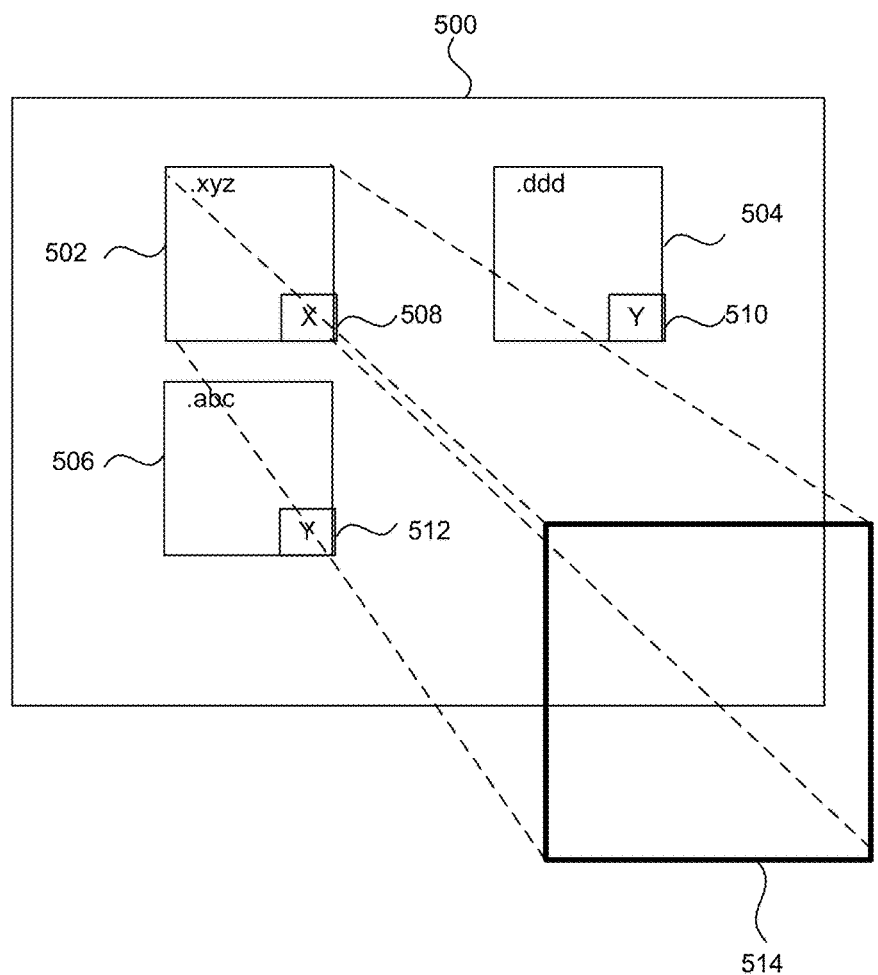
FIG. 5 is an example screen shot showing files available to a user.

With reference to FIG. 5, an example of a user interface 500 for allowing data preview before recalling large data files is shown. In some implementations, the user interface 500 is in the form of a folder view, depicting files available in the folder. In the example shown in FIG. 5, three files, 502, 504 and 506 are displayed to a user. The files may also show a file type, e.g., .xyz, .ddd and .abc respectively to identify the file to a user. Other variations of the folder view and file display are well known in art and are possible, but omitted in the present document for brevity. In FIG. 5, files 502, 504, 506 contain an additional cue, indicating to the user whether the file is available in its native format or in a preview format. A cue may be provided only for stub files (e.g., file in the native format is not available on the primary storage). Each displayed file icon may include another smaller icon (e.g., 508, 510, 512) indicating whether the file is available in its native format or in preview format. For example, 508 indicates that the file is not available in the native format while 510, 512 indicate that the file is available in the native format and locally stored.

In some implementations, audio tone cues are used to indicate such availability. For example, when a user moves the cursor over on the file icon, an audio tone is generated for stub, e.g., files that are not stored locally in their native formats. Various other techniques, e.g., use of different colors, different sizes, different fonts, etc. are also possible to provide audio/visual cues to the user about which files are stored locally and in native file format, and which are stub files, e.g., available from a secondary (or offline) storage and in a preview format.

When a user interacts with a file (e.g., file 502), a viewer application can be launched. The viewer application may be launched in a separate window 514 (e.g., a pop-up window). The viewer application is described in greater detail elsewhere in this document. The system may activate the viewer application when the user performs a specific action on the file icon (e.g., glide, single click, double click, etc.). The pop-up window may be an independent application frame with well-known attributes and controls such as "full page," "minimize," "move," "close," etc. Alternatively, the pop-up window is a balloon window which (other than below-described content browsing) is not further manipulatable by the user.

Preview Client Application

In some implementations, the viewing program used for showing content of a stub file to a user is operable on a computer platform as a preview client application. The preview client may be an off-the-shelf browser that is modified to display the files in their preview format (e.g., a JPEG viewer or an Internet browser). Alternatively, the preview client may be a custom viewing application. The preview client application may provide a static display of the content of a stub file. In other words, the preview client does not allow interaction with content being displayed. For example when text is displayed as a JPEG or a .bmp file, the preview client may not allow a user to select and copy text or images embedded within the content. Other image viewing clients may also be used (e.g., a TIFF viewer etc.).

In some implementations, the preview client allows some user interaction such as page forward/page backward/page skip for efficient navigation through file content via the stub file. For example, with the cursor on window 514, a user may be able to press page up/page down and receive different content, e.g., different video frames or different pages.

Figure 6:
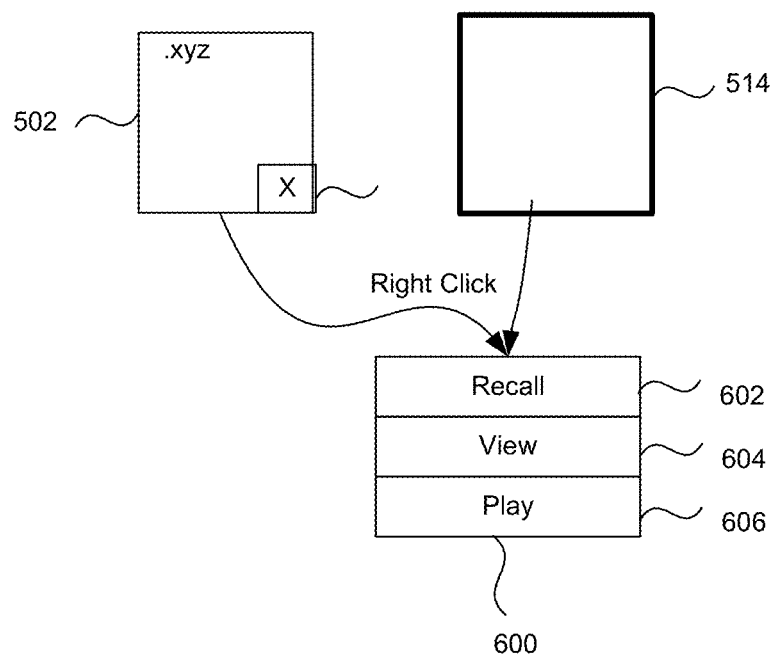
FIG. 6 is an example of menu options available to a user for interacting with a stored file.

FIG. 6 depicts additional tasks that can be supported for user interaction and control. In some implementations, while browsing the folder 500, a user can perform a specific action (e.g., a right click) to open a menu list 600 of possible actions. In some implementations, a user can open additional menu by performing specific actions (e.g., mouse right click) while having the cursor on the icon 502 or the preview area 514. The possible menu items (actions) include, for example, Recall 602, Play 604, Preview 606, and so on.

In some implementations, when a user selects the Recall 602 option, the computer system recalls the file to regenerate the file in native file format from a secondary storage or archive to the primary storage, thereby making the file available to the user locally and in the native file format. If the file is currently not available for recalling, for example, when the user is not connected to the appropriate network (e.g., a corporate, an intra network or the Internet) an error message is displayed to the user that the file is currently not available.

In some implementations, the View 604 mode is made available for multimedia files. For example, the selection of View 604 option, while previewing a media file, may result in, first, a recall of the media file from a secondary storage and, second, launching of an application (e.g., a media player) in which the media file can be viewed when it is recalled to the local storage.

In some implementations, the Play 606 option enables a user to put the underlying content "in motion." For example, if the underlying content is a multi-slide presentation, then the selection of play option results in an auto-staged playback of the slides in the "preview mode." As another example, in the play mode, pages of a multi-page document may be flipped automatically by the computer system.

In some implementations, the content of a stub file may be displayed to the user by refreshing content with next pages or next video frames, simply when the user's cursor is on the file icon. In some implementations, a stub file may be a hypertext markup language (HTML) file that can be viewed using a web browser. Of course, other file types and viewers may be used, such as the PDF file type and the Adobe Acrobat viewer.

Storage Management

In some implementations, after converting a file from a native format to a preview format, the file in native format is moved to secondary storage and information about the location in the secondary storage is associated with the copy in the preview format. The location information is associated with the preview format file. One of several well known mechanisms such as the user resource locator (URL) indicator may be used for the association.

Figure 7:
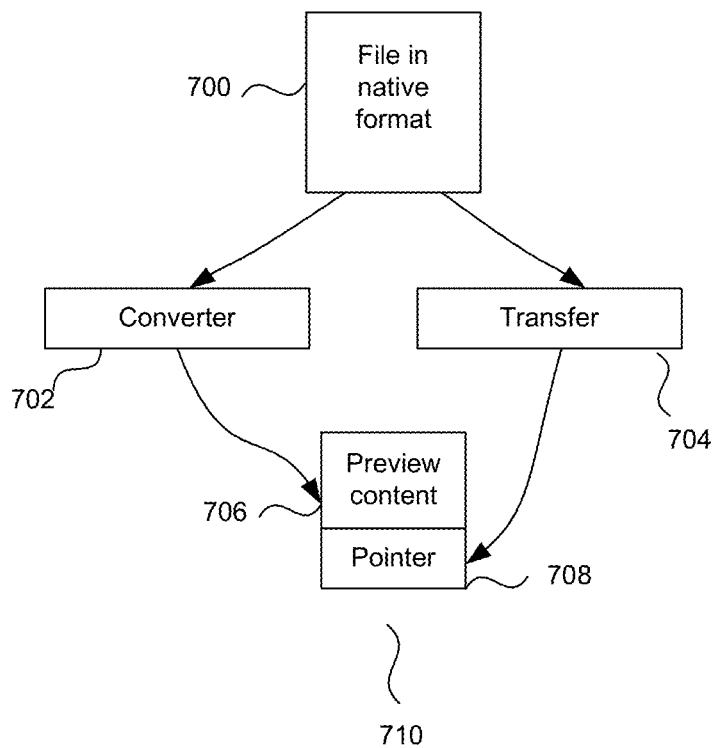
FIG. 7 is an example data structure used for storage of preview files.

FIG. 7 depicts an example block diagram representation of the creation of a stub file (or a file in a preview format) from the original file (file in a native format). The system processes file 700 through a converter 702 that converts the file from its native format to a preview format (e.g., from PDF to JPEG or from PowerPoint to PNG, etc.) to generate preview content 706 representation of the file 700. In other words, the converter 702 converts the native file to another, lower resolution format file, where the lower resolution format file contains less data, and thus consumes fewer data storage resources. In some implementations, the converter 702 may use off-the-shelf technologies such as the content-aware format converter by Stellent, a subsidiary of Oracle.

After the file is converted to the preview format, the system transfers the file in native format by a transfer module 704 to a secondary or archive storage, as previously described. Based on the transfer, the system generates a pointer 708 with information about where the transferred occurred to, or in other words, the location of the file in the secondary storage. The pointer 708 is associated with the viewable content 706, together representing the stub file 710.

In some implementations, the decision regarding which files to keep on the local storage and which ones to replace with their stub file versions is performed using a set of predetermined rules. The rules include, for example, criteria such as archiving least used files, files larger than a threshold size, files of a certain type (e.g., media files), files specifically identified by a user for such offline storage, files identified by an application as being suitable for offline storage, etc. A system administrator may be to modify or update the predetermined rules. The management of these rules, in one aspect, helps a corporate network strike the balance between storage use of an organization and response time to a user browsing through files on the corporate network. In other words, the organization can manage the amount of primary storage data storage required. The system can analyze historical trends in data being stored, data storage capacity (primary and secondary storage), bandwidth capacity for exchanging data files, and other factors. Based on statistical analysis of these historical trends, the system may periodically or continuously/dynamically change the rules to compensate for changes in data storage, data storage capacity, bandwidth, etc. Further details regarding other rules and processes for moving data objects to secondary storage, especially for mobile devices, is discussed below.

Figure 8:
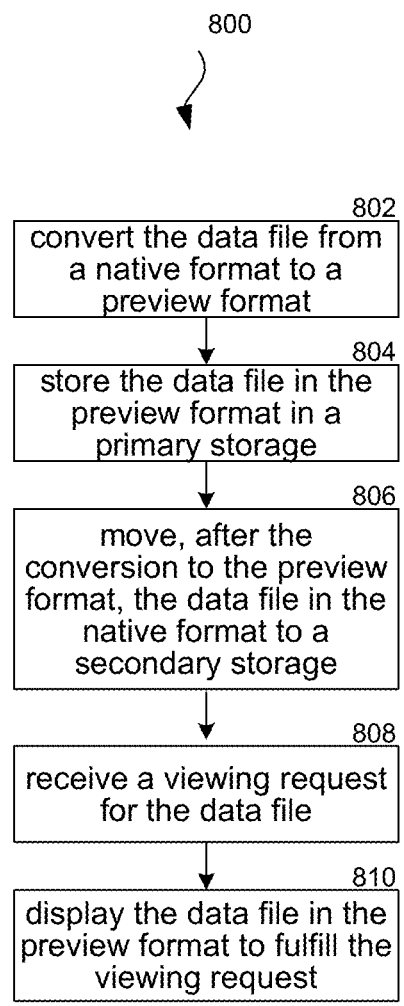
FIG. 8 is a flow chart representation of a process of providing offline access to a data object.
Figure 9:
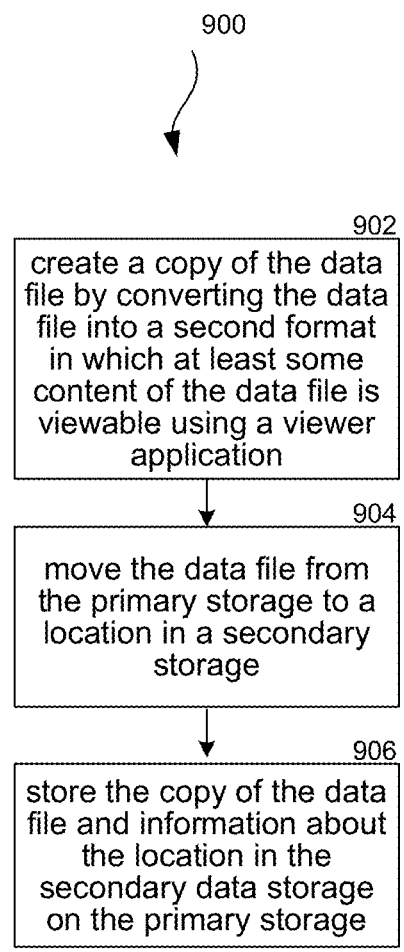
FIG. 9 is a flow chart representation of a process of managing storage capacity on a computer.

FIG. 8 is a flow chart representation of a process 800 for providing offline access to a data file. At 802, the system converts the data file from a native format to a preview format. Various encoders exist for converting files from one format to another. At 804, the system stores the data file in the preview format in primary storage. At 806, after converting the file to the preview format, the system moves the data file in native format to secondary storage, provide a link to it, and updates the data structure reflecting the new location of the native format in secondary storage. In this context, "moving" includes copying and then deleting from the primary storage.

At 808, the system, at some later time, receives a viewing request for the data file. At 810, if the file to be viewed as located in primary storage, the data file is displayed in the preview format to fulfill the viewing request. As previously discussed, in some embodiments, the preview format comprises a picture encoding format such as a JPEG image, or a bitmap format or a GIF (graphics intermediate format) image or a PNG (portable network graphics) image, and so on. At 818, if the file requested is the native format file, then the system accesses the data structure to identify the location of the native format file in secondary storage, and retrieves it for display or to be provided to the user.

In some implementations, a menu for accessing the data file in the native format is provided. As previously discussed, in some implementation an audio or a visual cue is provided to a user to indicate whether or not the file icon being browsed by the user is in the primary storage. For files that are not stored in the primary storage but are available by retrieving from a secondary storage, a menu may be provided in some implementations. For example, in some implementations, a user can access file open menu by right-clicking on the file icon.

As previously discussed, the process 800 may include a resource locator with the data object stored in the preview format. The resource locator is, e.g., in the URL format, indicating the location in the secondary storage of the native format data object. When the user selects to load the image in the native format, then access to the data object may be provided using the resource locator, using one of several well know network file interface schemes.

While the larger, native format file is generally described herein as being stored on the secondary storage, while the stub is stored on primary storage, the two may be stored together, within a single file. Thus, in an alternative embodiment, a single container file may include the initial preview file, followed by the native format file. A header may be provided in the container file to describe the contents, format and extends (e.g. size) of the embedded preview and native format files. The information management system may manage the container file as a single file, while the file system of a computing device may view the two files independently.

By embedding both preview and native format files within a container file, storage management efficiencies may be obtained. Further, such a container file may allow both the preview and native format files to be moved from primary storage to secondary storage. The stub described herein may link or point to the preview file within the container file, and it is this preview file that is returned by accessing the stub. However, with further input by the user, the system can retrieve the native format file for the user.

Forward Compatibility with Newer File Formats

When new file formats are introduced (e.g., newer video file formats or files generated by new releases of application programs), the converter 702 may simply be updated to add a module that is responsive to the new file format and is able to convert the new file format to a preview format such as a bitmap or a PNG format file.

Multimedia File Handling

It is well known that multimedia files, especially video files, often occupy a large amount of storage space, compared to documents and spreadsheets. In some implementations, the system replaces above-discussed pointer 708 with a list of pointers, with each pointer in the list pointing to a next section (e.g., a next independently decodable video frame or group of frames) of the stored video file. In one aspect, such as facility enables random access within a long video file and allows a user to recall a portion of a video file that is of interest. In other words, "bookmarks" may be provided and displayed to access sections or portions of the video file. In some embodiments, a video file in the native format (e.g., an mp4 video file) may be converted into its stub format by simply clipping the video file to first few seconds or by sampling video frames periodically (e.g., once every second). It will be appreciated that such techniques beneficially would result in a considerable reduction in the storage space needed for the stub file, compared to the original file, while still providing a user the ability to preview content of the file.

Mobile Computing Environment

In some implementations, a user accesses files (e.g., file folder 500) from a mobile device. A mobile device is often run on battery power and therefore it may be desirable to customize a user's access to the files based on the amount of battery power available to the mobile device. For example, in some implementations, when the available batter power (or time remaining for battery power operation) falls below a threshold, a user may be able to browse through a file 502, 504 or 506 only using a low power option. The low power option may be, e.g., limiting the user to only be able to preview the file in the preview format.

The system described herein can establish certain rules or policies to implement this functionality on a mobile device. For example, if the battery-power drops below a 20% threshold, then the system permits the mobile device to access only previews. However, when the battery-powered drops below a 10% threshold, then the system prevents the mobile device from launching resource intensive previews. For example, processor-intensive video decoding may be prohibited and/or access to previews that require downloads via a wireless link (locally stored previews would still be permitted). In other words, any applications that would burden the processor, or consume radio resources, would be rationed. Rather than prohibiting or inhibiting such functionality at these thresholds, the system may instead provide a click through warning for a user, which would require the user to acknowledge the resource intensive request before permitting the file to be accessed/viewed/previewed.

Furthermore, a mobile device typically also has a limited memory or processor power for application execution. For example, some mobile devices may not have a native Office application installed. In such mobile devices, the only option for a user to be able to view content of files for which no application is available locally may be to use a preview format. In such implementations, when a user attempts to browse through the content of a file, the content is made available only in a preview format.

Typical mobile devices may also be limited by viewing constraints such as screen resolution, color depth, etc. In some implementations, the converter 702 selects a target preview format based on such mobile device limitations. For example, in some implementations, the converter 702 creates multiple resolution images of content pages of a native format file. When the user wishes to browse through such multi-resolution content, the system provides or offers a preview file suitable for the user's mobile device capabilities (e.g., high resolution, low resolution, 18 bit color depth, etc.), also called device resource profile.

Further information regarding data storage methods for mobile devices may be found in the assignee's concurrently filed U.S. Patent Application No. 61/618,506, to Vibhor et al., entitled "Backup Methods for Mobile Devices," incorporated herein by reference in its entirety.

In some implementations, when a user syncs his user device to a corporate network, a synchronization server automatically stores file in the right format on the user device. For example, in the case of a mobile device that has a 352×240 screen resolution with 16 bit color depth, a preview file suitable for display on a 352×240 resolution with 16 bit color depth is "synched" or stored on the user device.

Figure 10:
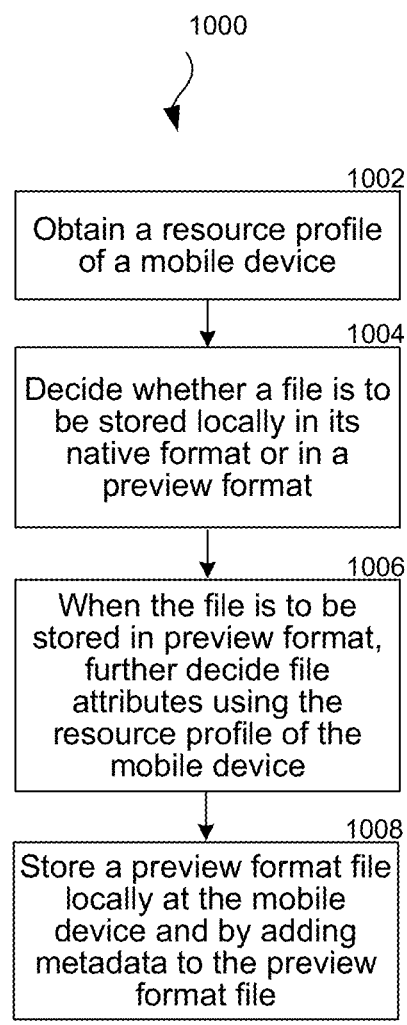
FIG. 10 is a flow chart representation of a process of synchronizing files stored on a user device.

With reference to FIG. 10, a synchronization server may implement a process 1000 as follows. At 1002, the synchronization server obtains a resource profile of a user device (e.g., battery life, display resolution, available memory, preview applications loaded on the user device, etc.). At 1004, based on the resource profile, the synchronization server then makes file storage decisions regarding multiple files to be made available to a user of the user device. For each file, the synchronization server decides whether to store the file in its native format on the user device or whether to store the file in a preview format on the user device and move the corresponding native format version to a secondary or archive location in the network.

At 1006, when the decision is to store a preview copy on the local storage of the user device, the synchronization server then decides attributes of the local copy (e.g., which preview format to use, what level of compression to use, etc.). The synchronization server may make decisions about the attributes of the local copy based on the resource profile of the user device. At 1008, in addition, the synchronization server adds metadata to the locally stored preview format file to indicate where to locate the file in its native format and whether the file is in a preview format or in its native format. To generate the preview format file, the synchronization server may communicate with the converter 702, previously discussed.

The above-discussed synchronization process may be run when a portable or mobile device is docked in a device dock or on a periodic basis (e.g., once every week). A user or a system administrator may be able to perform synchronization by running a script or a program. Mobile devices often have memory interfaces to attach a removable memory (e.g., secure digital memory card, SIM card, USB flash memory device, etc.). In some implementations, the removable memory card may be used to transfer files to/from a user's mobile device and the user's computer. For example, from the desktop, a user may be able to create a "To go" folder and add files to the folder by dragging and dropping the files into the folder. The system may then decide, using the previously discussed methodology, whether to store the file in its native format in the "To go" folder or whether to convert the file to a preview format before copying the file to the "To go" folder. Once the user has copied all the files he wants to this folder, the user can simply remove the memory device from the computer and attach the memory device to his mobile platform (phone, smartphone, tablet etc.).

The above-discussed system may be expanded to any data or even applications. Many current mobile devices, such as tablets and smart phones, have a maximum of 8 GB of storage. The present system may intelligently archive data and applications by scanning data and applications on the device and automatically backing up or moving to secondary storage old and unused data/applications, including data/applications that consume power on the device. For example, an electronic magazine subscription could consume 50 MB per issue, particularly if the magazine has many images. The system can automatically archive these old subscriptions, such as moving them to a secure cloud storage location associated with the mobile device. As another example, the system can scan applications running on the device, including identifying services accessed, to help understand power consumption, and compare that to use of those applications by the user—unused power-hungry applications can be automatically archived to free up not only data storage on the device, but also free up processing resources and conserve battery power.

Figure 11:
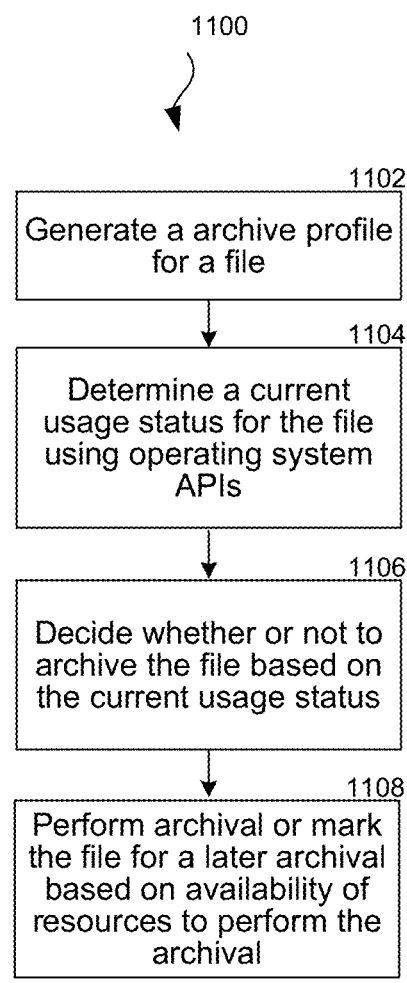
FIG. 11 is a flow chart representation of a smart archiving process implementable on a mobile device.

In some implementations, a smart archival application may be installed on a mobile device for monitoring memory use by locally stored files. The smart archival application may continuously run in the background or may periodically wake up and analyze memory usage and whether any local memory can be freed up by archiving unused files, as described above. In some implementations, the smart archival application may perform the actual archival task. In some other applications, the housekeeper application may only mark files for archival at next available opportunity (e.g., when the device is being run on AC power or the battery level is above a threshold such as 80%), FIG. 11 is a flow chart representation of a process 1100 of performing smart archiving on mobile devices. At 1102, an archival profile is generated for a file. The term "file" may include applications files (e.g., executables, DLLs, etc.). The archival profile may include rules related to when and when not to archive a file. The rules may be based on criteria such as (a) when was the file used last time, (2) file size, (3) if the file is for a gaming application, then has the user already finished the level for which the file is used, and so on. For example, files that are not used for a certain period (e.g., 30 days) may be considered archival candidates. Similarly, files that are greater than 2% of currently available memory or are larger than 50 Mbytes may be considered archival candidates. At 1104, a current usage status for a file may be determined using operating system application programmers interface (APIs). For example, several well known mobile phone operating systems provide APIs for querying file usage, access log, etc. At 1106, a decision is taken about whether or not to archive the file based on the current usage status. For example, the current usage status of the file indicates that the file meets the archival candidate criteria in the archive profile, a decision may be taken that the file should be archived. At 1108, based on availability of resources to perform the archival of the file, file archival may be performed using a previously discussed technique or alternatively the file may be marked for a later archival. For example, when the mobile device is running low on battery (e.g., less than 20%) or when a user is engaged in a CPU-intensive activity such as a game, file archiving may be deferred to a later time by simply marking files for archival.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, smart phones, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain examples are presented below in certain forms, the applicant contemplates the various aspects of the invention in any number of claim forms. Accordingly, the applicant reserves the right to add additional claims after filing the application to pursue such additional claim forms for other aspects of the invention.

The invention claimed is:

1. A computer program product comprising a computer-readable storage medium having code stored thereon, the code, when executed, causing at least one processor in a mobile device to perform a method of data management, the method comprising:
   providing to a remote synchronization server at least some data associated with a resource profile of the mobile device,
      wherein the resource profile of the mobile device includes information about an available battery power for the mobile device, applications installed on the mobile device, and amount of available memory on the mobile device,
      wherein the data associated with the resource profile includes information providing instructions associated with managing data files based on data types for the data files;
   receiving, at the mobile device from the remote synchronization server, at least a first data file in a native format and a second data file in a preview format,
      wherein the second data file in the preview format includes less data than an amount of data in the second data file in a native format; and
      wherein the second data file is received in the preview format based on a determination at the synchronization server that the second data file includes file attributes that are associated with providing the second data file in the preview format based on the available battery power for the mobile device falling below a threshold value;
   storing the second data file in the preview format locally at the mobile device along with metadata associated with the second data file,
      wherein the metadata includes an indication of a storage location for the second data file in the native format;
   receiving user input,
      wherein the received user input includes a request to view the second data file; and
   receiving at the mobile device the second data file in the native format in response to the received user input.

2. The computer program product of claim 1, wherein the file attributes of the preview format include at least one of: a preview image resolution, a preview image file format, a color depth of the preview format file, a picture compression format, and a size of the preview format file.

3. The computer program product of claim 1, wherein the second data file is stored as a hypertext markup language (HTML) format file viewable by a web browser on the mobile device, or stored as a Portable Document Format (PDF) format file viewable by a PDF viewer on the mobile device.

4. The computer program product of claim 1, wherein receiving user input includes receiving a user selection of the second data file in the preview format via a user interface of the mobile device, the computer program product further comprising:
   displaying the second data file in the preview format to the user via the user interface.

5. An apparatus for synchronizing files on a mobile device, the apparatus comprising:
   a profile module that obtains a resource profile of the mobile device,
      wherein the resource profile of the mobile device includes information about an available battery power for the mobile device, applications installed on the mobile device, and an amount of available memory on the mobile device;
   a storage decision module that determines a format for which a file is stored to the mobile device based on the resource profile of the mobile device,
      wherein the determined format for which the file is stored to the mobile device is a native format or a preview format,
      wherein the preview format of the file is a format having a lower resolution than the native format of the file; and
   a preview module that stores the file in the preview format locally to the mobile device based on a determination to store the file in the preview format.

6. The apparatus of claim 5, wherein the preview module stores metadata along with the file in the preview format locally to the mobile device,
   wherein the metadata includes an indication of a secondary storage location for the file in the native format.

7. The apparatus of claim 5, wherein the storage decision module determines the file is stored to the mobile device in the preview format based on a comparison of the resource profile of the mobile device and file attributes of the preview format,
   wherein the file attributes of the preview format of the file include at least one of a preview image resolution, a preview image file format, a color depth of the preview format file and a size of the preview format file.

8. A method performed by a server remote to a mobile device, the method comprising:
   receiving a request to transfer a data file to the mobile device;
   accessing a resource profile of the mobile device,
      wherein the resource profile includes information providing instructions associated with managing data files based on data types of the data files, and
      wherein the resource profile of the mobile device includes information indicating that an available battery power for the mobile device is less than a threshold value for presenting the data file in a native format;
   determining a format to store the data file at the mobile device based on the accessed resource profile of the mobile device;
   converting the native format of the data file to a preview format of the data file based on the determined format,
      wherein the preview format of the data file is a format having a lower resolution than the native format of the data file;
   storing the data file in the native format to a secondary storage location; and
   transferring the data file in the preview format to the mobile device to be stored locally at the mobile device along with metadata associated with the data file in the preview format,
      wherein the metadata includes an indication of the secondary storage location for the data file in the native format.

9. The method of claim 8, wherein determining a format to store the data file at the mobile device based on the accessed resource profile of the mobile device includes determining the data file is to be stored at the mobile device in the preview format based on a comparison of the resource profile of the mobile device and file attributes of the preview format, wherein the file attributes of the preview format of the file include at least one of a preview image resolution, a preview image file format, a color depth of the preview format file and a size of the preview format file, and wherein the resource profile of the mobile device includes information about at least one of: available battery power for the mobile device, applications installed on the mobile device, an amount of available memory on the mobile device, and a display resolution of the mobile device.

10. The method of claim 8, wherein the metadata includes multiple pointers to different secondary storage locations for different, respective, portions of the data file.

11. The method of claim 8, wherein the data file is a video file, and wherein the preview format is a picture encoding format.

12. The method of claim 8, wherein the data file is a .pdf file, and wherein the preview format is a JPEG format.

13. The method of claim 8, wherein the data file is a slideshow file, and wherein the preview format is a PNG format.

14. The method of claim 8, wherein the data file is a multimedia file, wherein the preview format is a picture encoding file, and wherein the metadata includes multiple pointers to different secondary storage locations for different, respective, portions of the video file.

15. The method of claim 8, wherein receiving a request to transfer a data file to the mobile device includes receiving a request based on input received at the mobile device from a user associated with the mobile device.

16. The method of claim 8, wherein receiving a request to transfer a data file to the mobile device includes receiving an indication that the mobile is connected to a network that includes the synchronization server.

\* \* \* \* \*